Dec. 29, 1964   R. ROCHE ETAL   3,163,584
SUPPORT HOUSING FOR EXTERNALLY SUPPORTING FUEL ELEMENTS
Filed March 7, 1960   2 Sheets-Sheet 1
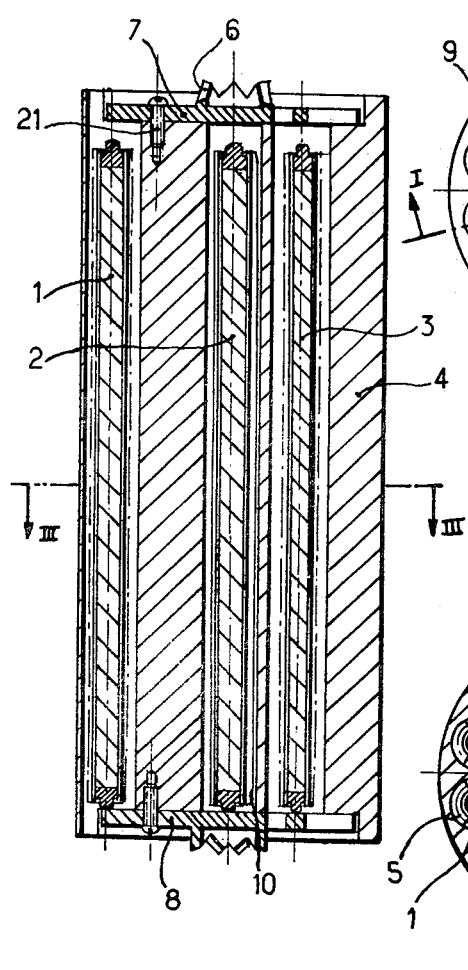
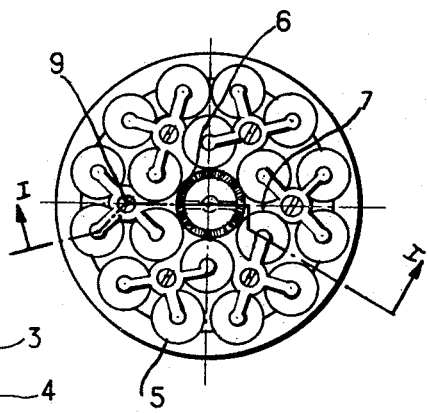
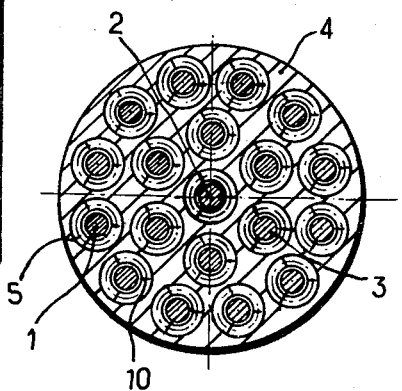

Dec. 29, 1964  R. ROCHE ETAL  3,163,584
SUPPORT HOUSING FOR EXTERNALLY SUPPORTING FUEL ELEMENTS
Filed March 7, 1960  2 Sheets-Sheet 2

3,163,584
SUPPORT HOUSING FOR EXTERNALLY
SUPPORTING FUEL ELEMENTS
Roland Roche, Clamart, and Bernard Vrillon, Vincennes, France, assignors to Commissariat a l'Energie Atomique, Paris, France
Filed Mar. 7, 1960, Ser. No. 13,187
Claims priority, application France, May 16, 1959, 789,460
3 Claims. (Cl. 176—41)

Heterogeneous nuclear reactors generaly include a large number of vertical or horizontal parallel channels formed in the moderator. These channels permit the flow of the cooling fluid and contain the nuclear fuel in suitable structures called fuel elements, or cartridges.

Some of these structures contain the fuel in the form of multiple rods, the rods, whether sheathed or not, being disposed parallel to the axis of the channel. The division of the fuel in each channel into a certain number of rods parallel to the axis of the channel has the effect of increasing the area available to the cooling fluid and, consequently, of improving the thermal performance of the reactor.

Known structures appertaining to fuel elements comprising parallel multiple rods may or may not comprise a support housing and are of different types:

(1) The rods are held at their ends by two grids rendered fast with one another by means of rectilinear bars parallel to the rods and forming sliding supports during the feeding in or removal of the fuel elements. This solution has been devised for nuclear reactors having horizontal passages. The rods rest one on the other through the intermediary of a wire wound in a helix around them.

(2) The rods are surrounded by a wire arranged in a helix as described above and they are held clamped one against the other by means of rings disposed at regular intervals along the fuel element; this structure therefore does not comprise a support housing.

(3) The rods are kept spaced from one another by means of spacers disposed at regular intervals along the fuel element; this structure does not comprise a support housing; the spacers may be formed, for example, by perforated plates or by pieces of tubing parallel to the rods and welded laterally between them and to a transverse band outside the element, some of the perforations in the plates or some of the spaces formed between the tubes being reserved for inserting the rods. It is to be noted that the presence of spacers or rings along the element causes local overheating.

(4) The rods are disposed inside a housing formed by a cylindrical casing surrounding the rod assembly and the two ends of which are detachable grids supporting the rods, which are removable, each rod being connected non-rigidly to each of the two grids so as to be able to lengthen freely under the effect of a supply of heat or of irradiation.

Among these structures, those which do not have a support housing generally exhibit the drawback of causing each rod of the fuel element to carry a load greater than its own weight. Those structures which do possess a support housing permit each rod to support only its own weight, but have the disadvantage of presenting to the cooling fluid a flow cross-section of complex shape and of leaving the fluid streamlines surrounding each of the rods dependent on one another, and this results in longitudinal convection phenomena which do not permit even cooling of each rod. Moreover, the cooling of different, similarly disposed, fuel rods is different at one and the same level of the rod.

The division of the fuel into an assembly of rods in accordance with the known structures described above therefore has certain disadvantages which it is important to remedy so as to obtain an improved structure permitting optimum cooling of all the parts of the fuel.

The present invention has for its object an improvement in support housings for externally supporting fuel elements in the form of parallel rods which seeks to remedy the above-mentioned drawbacks.

The reactor provides a support housing for externally supporting fuel elements in the form of parallel rods, comprising a cylindrical block made of material absorbing little of the neutron flux and including a plurality of compartments distributed regularly around the axis of the housing and parallel to said axis, so that each compartment, whose length is substantially that of a fuel element, may form an external housing for a fuel element centered therein and support it over its entire length.

The cylindrical block may be adapted at its ends to receive detachable abutments for holding the rods in their respective compartments.

It is immaterial whether the fuel elements are used horizontally or vertically, use in the horizontal position being more convenient since the abutments are then subjected only to slight stresses.

In both cases, the fuel rods only support their own weight. In vertical arrangement, each element supports the weight of the elements situated above it through the intermediary of the whole or part of the end cross sections of the cylindrical block.

The cylindrical block divided into compartments is made of material absorbing little of the neutron flux. The walls of the compartments must be sufficiently thick not to break up under the pressure of the cooling fluid, under the weight of the stack of fuel elements or during machining. However, account should be taken of the fact that the thicker the walls are, the higher the ratio of the volume of the solid parts of the block to the volume of its hollow parts, which has the effect of reducing the reactivity.

Generally speaking, the compartments are all parallel to the axis of the fuel element. They are identical in principle and each is adapted to contain a fuel rod. The rods are centered in their compartments in such manner as to be supported over their entire length. This centering may be effected by means of fins of the rods or of any other equivalent device permitting the passage of the cooling fluid. Owing to the existence of the compartments and the centering of the rods, the fluid cooling each rod circulates in a duct of regular cross-section and this allows optimum cooling of the rod.

The rods may be held in their compartments by means of detachable abutments. These abutments prevent them from coming out of the element both during manipulation and during their stay in the reactor. Said abutments may be formed by grids or perforated plates fastened to the ends of the fuel element and common to a plurality of compartments or to all of them. For this purpose, these ends may be provided with peripheral extensions. These grids or plates may be mounted on rings screwed to the ends of the cylindrical block. The abutments may also be formed by members in the form of small bars extending through the ends of the compartments. Removal or retraction of the abutments or stops permits easy withdrawal of the rods from the block and the replacement thereof by fresh rods.

So that the rods may be able to lengthen freely under the effect of a rise in temperature and/or of irradiation, the distance between the abutments is chosen to be greater than the maximum length of the rod: alternatively it is possible to provide at least one of the ends of the rod means fast with the latter and able to slide in the abutments.

The presence, if required, of supporting and centering means at the ends of the fuel element, on the outer face of the abutments or on the cylindrical block itself, for example on its peripheral extensions, does not require the fuel rods to support the weight of the stack and, if necessary, allows the alignment of the compartments of the element in question with those of the elements which are adjacent to it in the channel in the nuclear reactor.

Handling of the assembly consisting of the block, the rods, the abutments and any possible accessory means (rings, centering means) may be facilitated by the presence of recesses or shoulders on the cylindrical block. To this end, a groove may be hollowed out inside a peripheral extension of the block at one of the ends of the latter. The presence of such a groove is particularly useful for feeding in and removing the fuel elements through the upper part of the vertical passages of nuclear reactors, feeding in and removal of the fuel elements in the case of reactors having horizontal passages being carried out by the thrust of the element introduced on those which have preceded it.

The nature of the non-absorbent material forming the cylindrical block is a function of the type of nuclear reactor considered. Thus, zirconium may be used for helium-cooled reactors. Aluminium and magnesium may be used in the case of certain so-called "cold pile" reactors, the temperature of which does not exceed 200° C. Beryllium may be employed; there is no advantage at present in using it on an industrial scale in view of its cost, but its satisfactory behaviour at high temperatures ensures that it will be in demand when its cost makes it suitable for industrial use. Beryllium is too friable to be used. The most interesting material is graphite in view of its low cost, in addition to its resistance to corrosion, its mechanical strength (even at high temperature) and its low absorbing power in relation to neutrons. The graphite must be sufficiently fine and free from cavities or fissures to be machined conveniently, for example by drilling and broaching.

The advantages of the present improvement are as follows:

The rods are supported over their entire length and support only their own weight; in the general case of sheathed rods, if these are used in a vertical position the sheaths do not perform any mechanical role.

The compartmented cylindrical block may be used several times, renewal of the rods being possible owing to the ease with which the parts of which the element is formed can be dismantled.

Each rod is in the centre of a fluid passage of regular cros-section permitting optimum cooling of the fuel element.

As the rod is subjected little to mechanical stresses, long irradiations are possible and the maximum permissible element temperature is higher.

The shape and the nature of the rods may be changed without entailing changes in the structure of the nuclear reactor.

A channel may be charged with more fuel in its centre than at its ends, partial filling with fuel elements being possible. This arrangement permits improvement of the thermal performance of reactors.

The support housing structures of the present invention are particularly useful for fuel rods in heterogeneous nuclear reactors (there may be mentioned those of such reactors which employ uranium as fuel in the form of oxide or metal, and graphite or heavy water as moderator). However, these structures may be employed for other purposes. Thus, the fuel rods may be replaced by rods of different materials whose behaviour it is desired to study, in a channel of a nuclear reactor, under the effect of irradiation. It is also possible to use the structure as an ordinary casing or jacket for specimens to be irradiated in the channel.

Several embodiments of the present invention will now be described by way of example only, reference being had to the accompanying drawings in which:

FIGURE 1 is a section on the line I—I of FIGURE 2 of a support housing according to the invention showing fuel rods supported therein;

FIGURE 2 is a top view of the support housing; the rods have not been shown in this view;

FIGURE 3 is a section on the plane III—III of FIGURE 1; and

Figure 4:
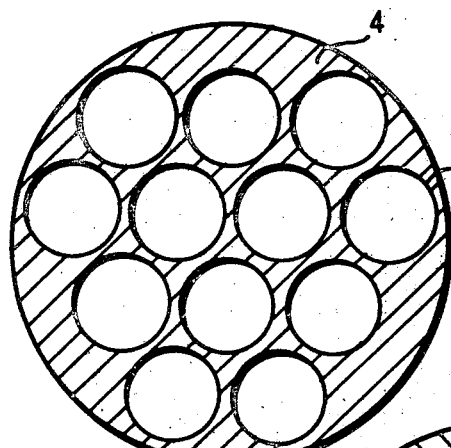
FIGURES 4, 5 and 6 show three modified forms of the housing shown in FIGURES 1 to 3 showing changes in the arrangement of the compartments.

The housing shown in FIGURES 1, 2 and 3 supports nineteen fuel rods, such as the rods 1, 2 and 3. The cylindrical block 4 is made of graphite. In this block there are drilled nineteen longitudinal compartments or seats of circular cross-section, such as the compartment 5 for the rod 1. A system of teeth 6 cut in abutment grids 7 and 8 permits centering of the support housing one with respect to the other. The outline of the abutment grids is shown in FIGURE 2. Each abutment grid is fixed to the graphite block 4 by means of six screws such as the screw 9. The rods are supported over their entire length in their recesses by means of their fins 10.

The abutment grids 7 and 8 and the screws are made of zirconium. The characteristics of this housing are as follows:

| | |
|---|---|
| Total length of housing _____mm__ | 300 |
| External diameter _____mm__ | 122 |
| Total weight of the uranium contained _____kg__ | 10 |

It is possible to use the block 4 several times. To replace worn-out rods by new rods, the following procedure is adopted: after removing the support housing and its contents from the nuclear reactor, the housing is allowed to remain for some time in a specially protected place so that it may lose that part of its activity which is due to the short-term fission products, and then, after removing the grids 7 and 8, the housing is clamped in jaws facing a machine comprising as many push fingers as there are fuel rods in the housing. These fingers are disposed exactly opposite each compartment or socket and, by engaging in the housing, they enable the latter to be emptied completely of its active rods. This ejection system is preferable to the mere action of gravity, the latter not permitting the extraction of certain rods which may be wedged in their compartments after long irradiation. After having been emptied of its charge, the cylindrical block 4 and the grids 7 and 8 are subjected to a check of their activity and, if necessary, to a deactivation washing. The block can then be filled afresh with fresh fuel, the grids replaced and the new charged support housing introduced into the reactor. All these operations are carried out by means of telemanipulators, in the shelter of enclosures or screens ensuring biological protection.

Figure 5:
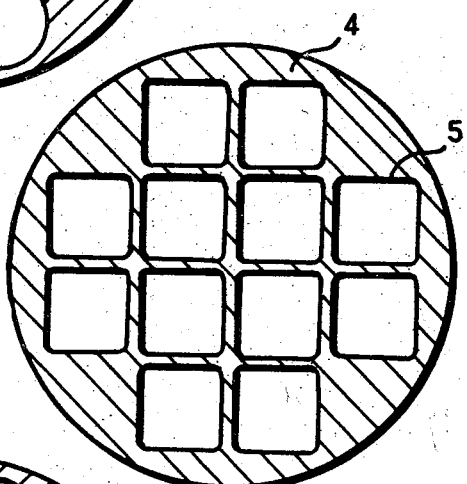
Figure 6:
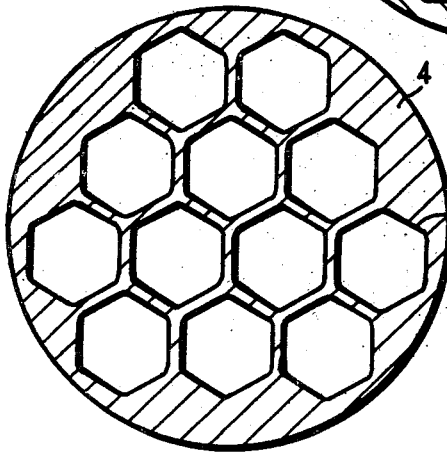

The structures shown in FIGURES 4, 5 and 6 correspond to the case of a graphite block 88 millimetres in diameter and 400 mm. in length comprising twelve compartments, whose cross-section is about 35 sq. cm. The minimum thickness of the walls of these compartments is two millimetres.

The cross-section of the compartment is circular in FIGURE 4 (radius equal to 19 mm.), square in FIGURE 5 (side equal to 17.3 mm.) and hexagonal in FIGURE 6 (side equal to 18.4 mm.) and the distribution is not the same. In the case of FIGURES 5 and 6, the thickness of the walls of the compartments is constant, which leads to an increase in reactivity in comparison with the arrangement of FIGURE 4. Moreover, the flow cross-section for the cooling fluid is slightly improved. The rods used are of circular cross-section and are centered by means of their fins disposed radially between the body of the rod and the apices of the square or hexagonal openings.

In other modifications, the blocks of the housings shown in FIGURES 1 to 6 may be made of zirconium, magnesium, aluminium, beryllium or their alloys, instead of being made of graphite.

We claim:

1. In a nuclear reactor, a fuel element assembly supporting structure containing fuel rods with a plurality of structures mounted in the duct of the nuclear reactor, a cylindrical block of low neutron flux absorption, a plurality of compartments in and parallel to the long axis of and opening through said block and a sheathed fuel rod in each of said comparments, the cross-sectional area of each of said compartments being greater than that of the associated fuel rod for passage of a cooling fluid therebetween.

2. A structure as described in claim 1 including detachable abutments secured at each end of said block holding said rods in said compartments.

3. A structure as described in claim 1, an abutment grid secured to and extending over each end of said cylindrical block and upstanding teeth disposed on said grid around the long axis of said block for centering said supporting structure with respect to adjacent supporting structure in the duct of the reactor.

References Cited by the Examiner

UNITED STATES PATENTS

| | | | |
|---|---|---|---|
| 2,708,656 | 5/55 | Fermi et al. | 176—58 |
| 2,831,806 | 4/58 | Wigner et al. | 176—94 |
| 2,938,848 | 5/60 | Ladd et al. | 176—68 |
| 3,005,766 | 10/61 | Bartnoff | 176—68 |

FOREIGN PATENTS

| | | |
|---|---|---|
| 229,588 | 5/59 | Australia. |

REUBEN EPSTEIN, *Acting Primary Examiner.*

WILLIAM G. WILES, CARL D. QUARFORTH,
*Examiners.*